United States Patent
Bellantoni

(10) Patent No.: US 7,369,811 B2
(45) Date of Patent: May 6, 2008

(54) SYSTEM AND METHOD FOR SENSITIVITY OPTIMIZATION OF RF RECEIVER USING ADAPTIVE NULLING

(75) Inventor: John Vincent Bellantoni, Redwood City, CA (US)

(73) Assignee: WJ Communications, Inc., San Jose, CA (US)

( * ) Notice: Subject to any disclaimer, the term of this patent is extended or adjusted under 35 U.S.C. 154(b) by 0 days.

(21) Appl. No.: 11/116,494

(22) Filed: Apr. 27, 2005

(65) Prior Publication Data

US 2006/0033607 A1    Feb. 16, 2006

Related U.S. Application Data

(60) Provisional application No. 60/567,114, filed on Apr. 30, 2004.

(51) Int. Cl.
H04B 7/00    (2006.01)

(52) U.S. Cl. .................. 455/41.2; 455/68; 375/295; 340/372.4

(58) Field of Classification Search .............. 455/41.2, 455/410, 68; 330/149, 52; 375/295, 296, 375/308, 362; 340/572.4
See application file for complete search history.

(56) References Cited

U.S. PATENT DOCUMENTS

| | | | |
|---|---|---|---|
| 3,021,521 A | 2/1962 | Hutchins | |
| 4,075,632 A | 2/1978 | Baldwin et al. | |
| 4,968,967 A * | 11/1990 | Stove | 342/165 |
| 4,970,519 A | 11/1990 | Minnis et al. | |
| 5,805,082 A | 9/1998 | Hassett | |
| 6,107,910 A | 8/2000 | Nysen | |
| 6,114,971 A | 9/2000 | Nysen | |
| 6,320,461 B1 * | 11/2001 | Lee | 330/52 |
| 6,337,599 B2 * | 1/2002 | Lee | 330/149 |
| 6,452,446 B1 * | 9/2002 | Eisenberg et al. | 330/52 |
| 6,853,691 B1 * | 2/2005 | Kim | 375/308 |
| 6,938,200 B2 * | 8/2005 | Pax et al. | 714/798 |
| 6,970,089 B2 * | 11/2005 | Carrender | 340/572.4 |

\* cited by examiner

*Primary Examiner*—Sanh D. Phu
(74) *Attorney, Agent, or Firm*—Morgan, Lewis & Bockius LLP

(57) ABSTRACT

The present invention provides sensitivity enhancement for a single antenna RFID interrogating device by separately coupling a nulling signal formed using a portion of a transmit signal into a receiver. The phase and amplitude of nulling signal can be adjusted so that the nulling signal cancels that a reflected transmit signal from the antenna, resulting in the small backscattered signal from the distant RFID tag to be more easily detected, and improving the sensitivity of the RFID receiver.

12 Claims, 6 Drawing Sheets

SYSTEM AND METHOD FOR SENSITIVITY OPTIMIZATION OF RF RECEIVER USING ADAPTIVE NULLING

CROSS REFERENCE TO RELATED APPLICATIONS

The present application claims the benefit of and priority under 35 U.S.C. 119 and/or 35 U.S.C. 120 to U.S. Provisional Patent Application No. 60/567,114 filed on Apr. 30, 2004, entitled "Sensitivity Optimization of Single-Antenna RFID Interrogating Device by Adaptive Nulling of the Transmitted Signal," the entire disclosure of which is incorporated herein by reference.

FIELD OF THE INVENTION

The present application relates in general to technologies associated with radio frequency (RF) transceivers, and in particular to sensitivity optimization using adaptive nulling of transmitted signal in a single antenna RFID interrogating device.

BACKGROUND OF THE INVENTION

RFID technologies are widely used for automatic identification. A basic RFID system includes an RFID tag or transponder carrying identification data and an RFID interrogator or reader that reads and/or writes the identification data. An RFID tag typically includes a microchip for data storage and processing, and a coupling element, such as an antenna coil, for communication. Tags may be classified as active or passive. Active tags have built-in power sources while passive tags are powered by radio waves received from the reader and thus cannot initiate any communications.

An RFID reader operates by writing data into the tags or interrogating tags for their data through a radio-frequency (RF) interface. During interrogation, the reader forms and transmits RF waves, which are used by tags to generate response data according to information stored therein. The reader also detects reflected or backscattered signals from the tags at the same frequency, or, in the case of a chirped interrogation waveform, at a slightly different frequency.

The reader may detect the reflected or backscattered signal by mixing this signal with a local oscillator signal. This detection mechanism is known as homodyne architecture. Separate antennas for transmission and reception can be used, as discussed in, for example, U.S. Pat. No. 6,114,971. In this case effective isolation of the received signal from the transmitter can be easily obtained, but two antennas separated by a significant distance or a shielding structure of some kind must be used. Efficient antennas are physically large, particularly at low frequencies such as c. 450 MHz or c. 900 MHz, and the use of two antennas necessitates a large interrogating device, which is incompatible with the portability and versatility features desirable in many RFID applications.

RFID readers using only one antenna are also known in the art, as described, for example, in U.S. Pat. No. 6,107,910. RFID readers with a single antenna for both transmit and receive functions are developed by employing a microwave circulator or directional coupler to separate the received signal from the transmitted signal. A tapped transmission line serves as both a phase shifter and directional coupler alternatively may be used, such as the one described in U.S. Pat. No. 5,850,187. Such devices, however, are not capable of distinguishing between the modulated reflected signal from the RFID tag, placed typically at a distance of some meters from the antenna, and the reflection of the transmitted signal from the antenna structure itself. The reflection is typically caused by the inevitably imperfect match of the antenna input impedance to the transmission line impedance of the antenna feed connection.

The reflection of the transmitted signal can present significant impediment to achieving good sensitivity in the detection of backscattered signal the passive RFID tag. This can be explained further using the example illustrated in FIG. 1, which shows an RF transmitter 110 connected to an antenna 120 via a coupler or isolator 130. The transmitter 110 is shown to comprise a microprocessor system controller 112, a frequency synthesizer 114, an optional modulator 116, and an amplifier 118. An RF receiver (not shown) is also coupled to the antenna 120 through the coupler 130. If the transmitter has a 1 watt or 30 dBm output power at 925 MHz and the antenna, being very well matched, has a return loss of −15 dB, the reflected transmit power captured by the coupler or isolator will be (30−15)=15 dBm, ignoring incidental losses in the circuitry. The coupler removes only a portion of the reflected signal, for example, 10% of the reflected power for a 10 dB coupler. So, the resulting reflected power into the receiver will be approximately 5 dBm. Such a large signal creates significant obstacles in the attempt to detect the tiny backscattered signal from the RFID tag, which may be as small as −90 to −100 dBm.

DC offsets due to second-order distortion of the large reflected signal in the receive chain will occur in a homodyne radio, in which the LO and received/reflected signals are at the same frequency. AC coupling of the amplifier chain may be prohibited due to loss of information near zero frequency, depending on the protocol; in this case, the DC offsets will be multiplied by the gain of the chain, which may be as high as 100 dB in order to detect small backscattered signals, leading to saturation of the downstream amplifiers and desensitization to the wanted signal. Even in the case where DC signals are not of consequence, as for example when the RFID tag is modulated at a subcarrier frequency of a few MHz, the large reflected signal is present in all the amplifier stages prior to channel filtering, and can lead to saturation, desensitization, and recovery problems in the transition from the modulated transmitted signal to the continuous wave (CW) receive state which is typically employed in passive tag interrogation. For all these reasons it would be desirable to remove as much of the reflected signal as possible from the receiver input.

A perfectly matched antenna structure cannot be guaranteed by design or manufacture, due to the variability in the near-antenna environment, which is encountered during actual use of the reader. An adaptive antenna tuning circuit, combined with appropriate optimization/calibration algorithms, could be considered for this purpose. However, mechanical tuners cannot respond on the sub-millisecond time scale required in frequency-hopping systems typically used for RFID applications in unlicensed bands. Electrical tuning elements have sufficiently fast response times to retune rapidly after a frequency hop, but are typically constructed using, as their variable elements, voltage-sensitive devices such as voltage-variable capacitors (varactors), which change their impedance in a complex fashion when exposed to the large RF transmit voltages, giving rise to unacceptable transmit distortion, degraded return loss, and spurious radiated output frequencies.

What is needed is an adaptive method of removing all or most of the antenna reflected signal from the receiver signal.

SUMMARY OF THE INVENTION

The embodiments of the present invention provide an RFID reader with enhanced sensitivity toward responding signals from RFID tags. The RFID reader comprises an RF transmitter and an RF receiver, and includes or is adapted to connect to an antenna for transmitting interrogation signals and receiving the responding signals. A nulling signal is formed in the RFID reader from a first portion of a transmit signal and is coupled into the receiver, the nulling signal is adapted in phase and amplitude to substantially cancel a second portion of the transmit signal reflected from the antenna.

In one embodiment, the RFID interrogating reader comprises an RF transmitter configured to form the transmit signal, a first directional coupler configured to extract a first portion of the transmit signal, a vector modulator configured to adjust the first portion of the transmit signal in phase and amplitude to form the nulling signal, and a second directional coupler configured to combine at least a portion of the nulling signal with the second portion of the transmit signal reflected from the antenna and at least a portion of a responding signal from an RFID tag received by the antenna. The phase and amplitude of the first portion of the transmit signal is adjusted such that the nulling signal can be used to substantially cancel the second portion of the transmit signal reflected from the antenna, thereby enhancing the sensitivity of the RF reader toward the responding signal.

In one embodiment, the RFID reader further comprises a detector configured to receive a feedback portion of a combined signal entering the receiver from the second directional coupler, and a controller configured to receive the detected feedback from the detector and to determine at least one electrical measure based on the detected feedback. The at least one electrical measure is used by the vector modulator to adaptively attenuate the first portion of the transmit signal and to adaptively change the phase of the first portion of the transmit signal.

The vector modulator is capable of receiving large input signals without introducing excessive distortion or performance degradation. In one embodiment, the vector modulator comprises a splitter configured to receive the first portion of the transmit signal from the first directional coupler and to split the first portion of the transmit signal into a first branch signal and a second branch signal, an upper branch coupled to the first voltage and configured to receive the first branch signal from the splitter and to form a first output signal from the first branch signal, and a lower branch coupled to the second voltage and configured to receive the second branch signal from the splitter and to form a second output signal from the second branch signal. A magnitude and polarity of the first output signal is dependent on the first voltage and a magnitude and polarity of the second output signal is dependent on the second voltage. The vector modulator further comprises a 90° hybrid coupler coupled to the upper and lower branches and configured to combine the first and second output signals in quadrature. Thus, the phase and amplitude of the signal output from the vector modulator can be easily adjusted by adjusting the first and second voltages.

In one embodiment, the upper or lower branch comprises a hybrid coupler having an input port, a transmitted port, a coupled port, and an output port, the input port being coupled to the splitter, a pair of p-intrinsic-n diodes coupled to the transmitted port and the coupled port, respectively, a pair of inductors serially coupled with each other and between the transmitted port and the coupled port of the hybrid coupler, a circuit node between the pair of inductors being coupled to the first or second voltage through a series resistor, and a capacitor coupled between the series resistor and ground.

The embodiments of the present invention further provide a method of interrogating a passive RFID tag performed by an RFID reader connected to an antenna. The method comprises forming a transmit signal, extracting a first portion of the transmit signal, adjusting the first portion of the transmit signal in phase and amplitude to form a nulling signal, and combining at least a portion of the nulling signal with a second portion of the transmit signal reflected from the antenna.

The adaptive nulling technique in the embodiments of the present invention enables the small responding signals from distant RFID tags to be more easily detected, improving the sensitivity of a RF receiver.

DETAILED DESCRIPTION OF PREFERRED EMBODIMENTS

Figure 1:
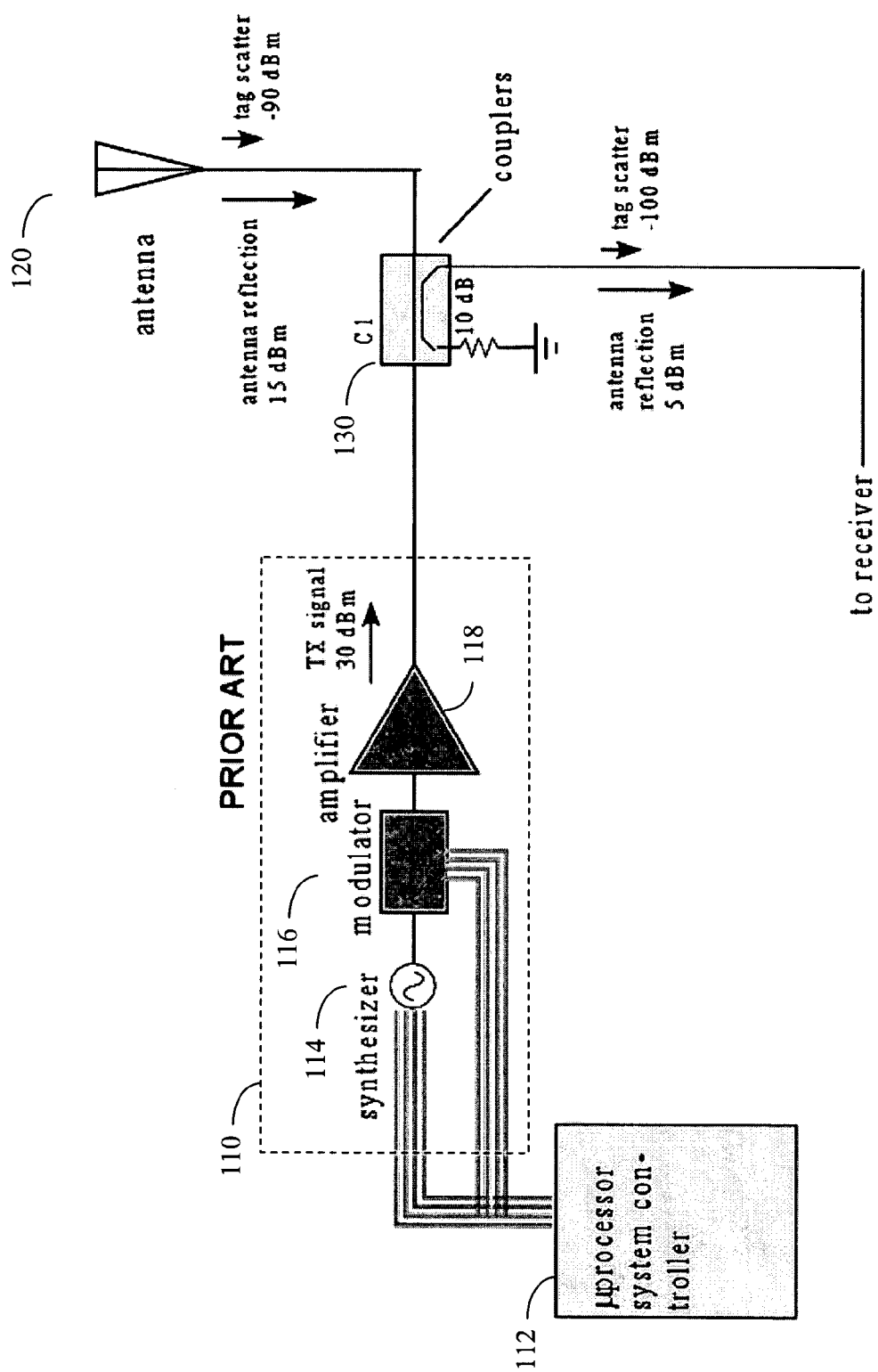
FIG. 1 is a block diagram of a prior art transceiver unit.

The invention may be better understood with reference to the block diagram of a conventional transceiver unit, which may be a conventional interrogation device, as shown in FIG. 1, in which only those portions of a prior art device relevant to the invention are depicted. In the transmitter 110 in the conventional interrogation device shown in FIG. 1, a transmit (TX) signal is generated by the computer-controlled synthesizer 114, optionally modulated with the modulator 116, and amplified by the amplifier 118 to an appropriate level, such as 1 watt (30 dBm), as shown in the figure. The amplified signal is coupled into the antenna 120 with finite return loss, such as 15 dB. Herein for simplicity we will neglect small corrections to the various signal powers resulting from losses in the circuit boards, cables, etc., to focus on the primary nature of the invention. Thus, a reverse propagating signal entering the directional coupler 130 from the antenna side may include the reflected transmit signal from the antenna 120, at a power level of about 15 dBm, onto which is superimposed a responding signal received from a distant RFID tag, at some much lower power level, for example −90 dBm. Directional coupler 130 selectively extracts a portion of the reverse propagating signal and sends it to the receiver. As an example, for a 10 dB coupler, meaning 10% of the reverse propagating signal appears at the coupler output at the receiver side, the signal delivered to the receiver should include a −5 dBm reflected transmit signal and a −100 dBm wanted signal from the distance RFID tag.

Figure 2:
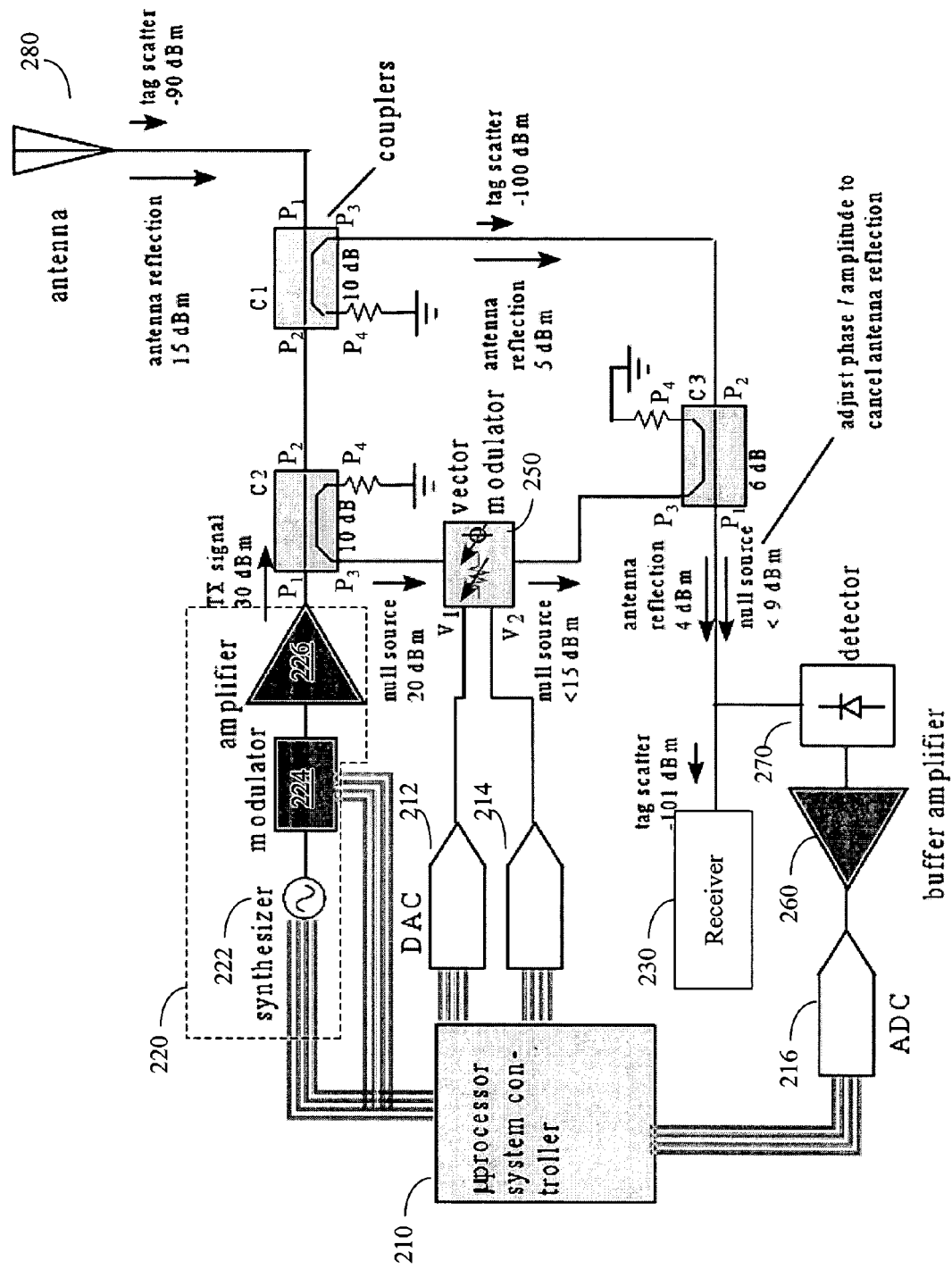
FIG. 2 is a block diagram of an RFID reader employing an adaptive nulling arrangement in accordance with one embodiment of the present invention.

Referring now to FIG. 2, an RFID reader 200 employing an adaptive nulling arrangement according to one embodiment of the present invention comprises a controller 210, an RF transmitter 220 comprising a frequency synthesizer 222 coupled to the controller 210, an optional modulator 224 coupled to the frequency synthesizer 222 and the controller 210, an amplifier 226 coupled to the modulator 224, and an RF receiver 230. RFID reader 200 further comprises a vector modulator 250 coupled to the controller 210 via two digital to analog converters (DAC) 212 and 214, a buffer amplifier 260 coupled to the controller 210 via an analog to digital converter (ADC) 216, and a detector 270 coupled to the buffer amplifier 260. The RFID reader 200 further comprises directional couplers ("coupler") C1, C2, and C3.

Each of couplers C1, C2, and C3 has an input port P1, a transmitted port P2, a coupled port P4, and an isolated port P4, which is terminated through a resistor. Each coupler is configured to extract a portion of a signal passing from port P2 to port P1, which extracted portion is output at port P3. Each coupler is also configured to allow a large portion (e.g., 90%) of a signal received at port P1 to pass to port P2. At least, coupler C3 is further configured to extract a portion of a signal entering its port P3 and output the extracted portion at its port P2.

In one embodiment, RFID reader ("reader") 200 is connected to an antenna 280; coupler C1 has its port P1 coupled to port P1 of coupler C2, its port P2 coupled to antenna 280, and its port P3 coupled to port P1 of coupler C3; coupler C2 has its port P2 coupled to an output of amplifier 140 and its port P3 coupled to an input of vector modulator 250; and coupler C3 has its port P3 coupled to an output of vector modulator 250 and its port P2 coupled to receiver 230 and to detector 270.

Controller 210 is configured to control the operation of various components of reader 200 by processing a plurality of input signals from the various components and producing a plurality of output signals that are used by respective ones of the components. The input signals to the controller 210 include those from frequency synthesizer 220, modulator 230, ADC 216, and the receiver 230. The output signals from the controller include those sent to frequency synthesizer 220, modulator 230, DAC 212, DAC 214, and the receiver 230. Frequency synthesizer 220 is configured to generate a continuous wave (CW) signal, modulator 230 is configured to modulate the CW signal according to instructions from controller 210, and amplifier 240 is configured to amplify the modulated signal to a specified level and output the amplified modulated signal as a transmit (TX) signal Coupler C2 is configured to extract a small portion (e.g., 10%) of the transmit signal and deliver the extracted portion of the transmit signal to vector modulator 250. Vector modulator 250 is configured to adjust the amplitude and phase of the portion of the transmit signal, and to output the adjusted signal as a nulling signal or null source. The rest of the transmit signal is sent to antenna 280 via coupler C1 for transmission to at least one RFID tag, which sends a responding signal in response by, for example, backscattering. Antenna 280 often has a finite return loss. So, a second portion of the transmit signal is likely reflected from antenna 280 and travels back towards coupler C1 and be coupled by coupler C1 together with at least a portion of the responding signal into a receive chain of the RFID reader. The receive chain comprises coupler C3 and receiver 230. In one embodiment, vector modulator 250 is configured to allow variation of an insertion loss (or attenuation) from 5 dB to 20 dB, and variation of an insertion phase (or phase change) over a full 360°. In the particular implementation depicted in FIG. 2, the nulling signal or null source from vector modulator 250 may be as large as 15 dBm, when vector modulator 250 is adjusted for minimum attenuation.

This nulling signal is sent to port P3 of directional coupler C3, which couples at least a portion of the nulling signal to its port P2, wherein the portion of the nulling signal is combined with portions of the second portion of the transmit signal and the responding signal, which comes from antenna 280 via couplers C2 and C3. The coupling coefficient of coupler C3 is chosen such that the nulling signal at port P2 of coupler C3 is at least as large as the reflected transmit signal at port P2 of coupler C3, which is to be compensated. In the example shown in FIG. 2, a 6 dB coupler C3 is shown, producing a nulling signal as large as, for example, 9 dBm. The nulling signal is adapted in phase and amplitude to cancel or nearly cancel the reflected transmit signal, resulting in an substantial enhancement of the sensitivity of the receiver 230 towards the small backscattered signal from the RFID tag. It should be noted that the coupling coefficients of the couplers C1, C2, and C3 can be varied as needed to optimize other aspects of the performance of the interrogation device 200, so long as the maximum power of the nulling signal at port P2 of coupler C3 is at least as large as the reflected transmit signal at port P2 of coupler C3.

Receiver 230 can be any receiver suitable for use in an RFID reader, including homodyne or heterodyne receivers. An example of receiver 230 is described in commonly assigned co-pending U.S. patent application Ser. No. 11/021,302, entitled "A Multiprotocol RFID Reader" filed on Dec. 23, 2004, the entire disclosure of which is hereby incorporated by reference in its entirety.

The adaptation of the nulling signal in phase and amplitude can be accomplished by adaptively adjust the insertion loss and insertion phase of the vector modulator 250. In one embodiment, a small feedback portion of the combined signal at port P2 of coupler C3 is coupled to detector 270, which can be implemented as a Schottky diode with a low-pass filter (not shown) and a buffer amplifier 260. The signal from the detector is digitized by ADC 216 and provided to the controller 210, which forms at least one output signal sent to DAC 212 and/or DAC 214 based on the signal from the detector 270. The at least one output signal is converted by DAC 212 and/or DAC 214 into at least one electrical measure, which is provided to the vector modulator 250. In one embodiment, the at least one electrical measure comprises voltages $V_1$ and $V_2$, which are used by vector modulator 250 to adjust the phase and amplitude of the nulling signal. Selection of the control voltages $V_1$ and $V_2$ may be performed by controller 210 using conventional methods, which may comprise, for example, a calibration step prior to receiving the backscattered signal. Optimization of the control voltages can employ any conventional optimization algorithm such as the method of steepest descents, simplex minimization, etc. The voltages $V_1$ and $V_2$ may be recomputed for each receiving operation, or determined from a look-up table obtained by a prior calibration over varying conditions of frequency and modulation.

Figure 3:
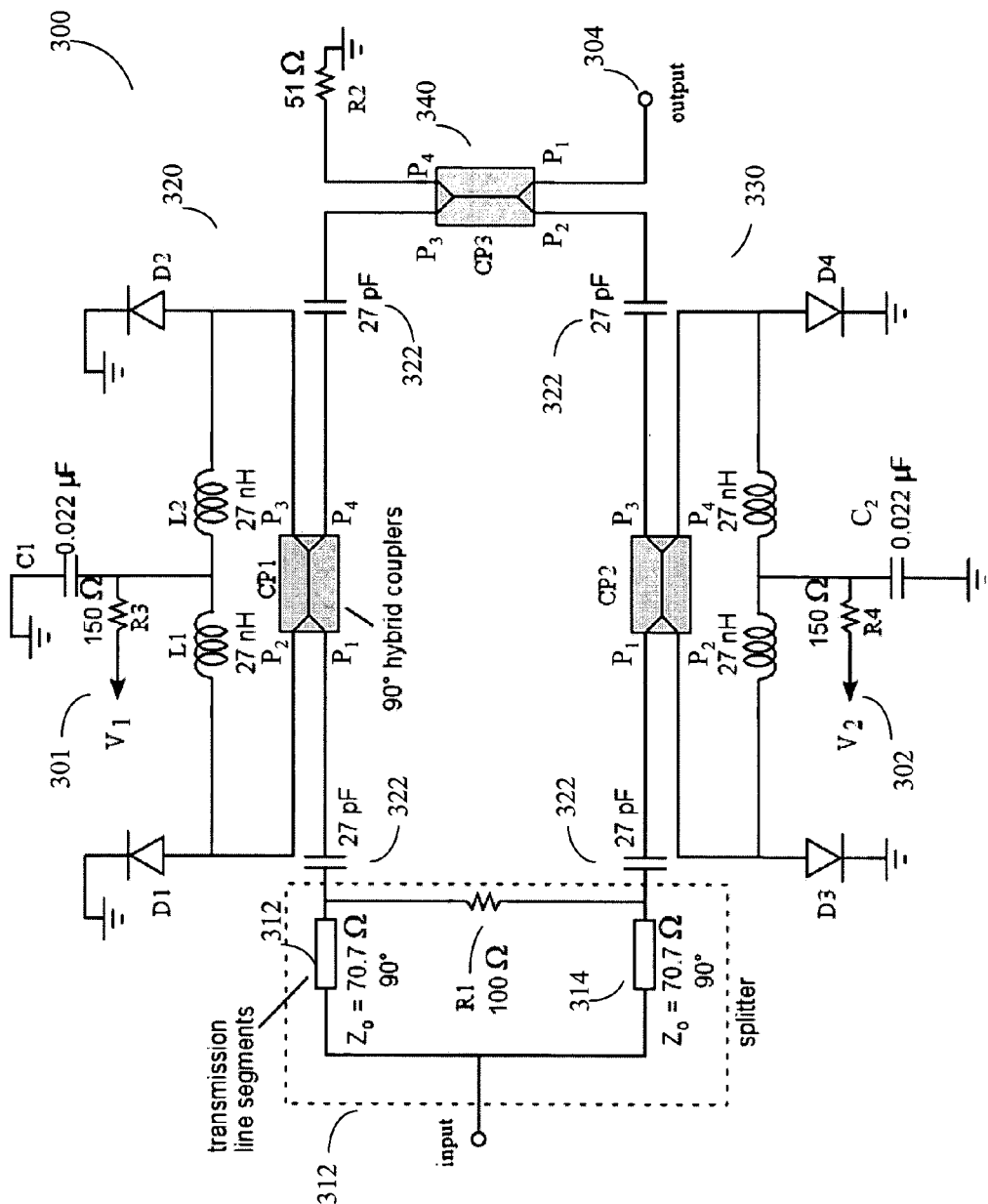
FIG. 3 is a circuit schematic diagram of an exemplary vector modulator in accordance with one embodiment of the present invention.

Vector modulator 250 may be implemented using various approaches well known in the art; with the constraint that the modulator should accept relatively large input signals without introducing excessive distortion or performance degradation. FIG. 3 illustrates a vector modulator 300 that is well suited to such requirements in the range of frequencies around 900 MHz. In the example shown in FIG. 3, vector modulator 300 comprises a first control terminal 301 for receiving control voltage $V_1$, a second control terminal 302 for receiving control voltage $V_2$, an input terminal 303 for coupling to port P3 of coupler C1, and an output terminal 304 for coupling to port P3 of directional coupler C3. Vector modulator 300 further comprises a splitter 310, an upper branch 320, a lower branch 330, and a signal combiner 340. Splitter 310 is coupled to input 303 and configured to split a signal received at the input port into two equal parts and send the two equal parts to the upper branch 320 and the lower branch 330, respectively.

Splitter 310 can be any conventional RF signal splitter. In the example shown in FIG. 3, splitter 310 comprises two transmission line segments 312 and 314 coupled to the upper and lower branches 320 and 330, respectively, and a resistor R1 coupled between the two transmission line segments 312 and 314 and between the upper and lower branches 320 and 330. Each transmission line segment 312 or 314 contributes an impedance value $Z_0$. In one embodiment, the impedance $Z_0$ corresponds to a quarter wavelength phase change in the input signal. At around 900 MHz, $Z_0$ is about 70.7 Ω.

In one embodiment, upper branch 320 comprises a 90° hybrid coupler (hybrid) CP1, which has four ports, an input P1, a transmitted port P2, a coupled port P3, and an output port P4, a pair of p-intrinsic-n (PIN) diodes, D1 and D2, each having an effective RF resistance dependent upon a DC current there through, and a pair of inductors L1 and L2 each coupled between a respective one of ports P2 and P3 of hybrid CP1 and a respective one of PIN diodes, D1 and D2. Upper branch 320 further comprises capacitor C1 coupled between a circuit node connected to both L1 and L2 and ground, and series resistor R3 coupled between control input 301 and capacitor C1. Capacitor C1 and resistor R3, together with inductors L1 and L2, are used to create a bias network to deliver DC currents from V1 to the two PIN diodes D1 and D2, thereby varying their RF resistance while isolating the DC source V1 from RF signals in the upper branch 320. Upper branch 320 may further comprise one or more capacitors 322, which serve to weed out low-frequency noises in the RF signals.

To match the upper branch 320, lower branch 330 comprises a 90° hybrid coupler (hybrid) CP2, which has four ports, an input P1, a transmitted port P2, a coupled port P3, and an output port P4, a pair of p-intrinsic-n (PIN) diodes, D3 and D4, each having an effective RF resistance dependent upon a DC current there through, and a pair of inductors L3 and L4 each coupled between a respective one of ports P2 and P3 of hybrid CP2 and a respective one of PIN diodes, D3 and D4. Lower branch 330 further comprises capacitor C2 coupled between a circuit node connected to both L3 and L4 and ground, and series resistor R4 coupled between control input 302 and capacitor C2. Capacitor C2 and resistor R4, together with inductors L3 and L4, are used to create a bias network to deliver DC currents from V2 to the two PIN diodes D3 and D4, thereby varying their RF resistance while isolating the DC source V2 from RF signals in the upper branch 320. Upper branch 320 may further comprise one or more capacitors 332, which serve to weed out low-frequency noises in the RF signals.

Couplers CP1 and CP2 are 90° hybrid couplers of the type well known in the art. A particular manufactured coupler which is suitable for this application is the 1P603 hybrid coupler from Anaren Inc., but other similar products may also be used, or couplers may be constructed on the circuit board using coupled microstrip transmission lines, as described in commonly assigned U.S. Pat. No. 5,629,654, which is incorporated herein by reference.

Signal combiner 340 can be any device configured to combine two signals received at its two input ports and output the combined signal at its output. In one embodiment, combiner 340 is a 90° hybrid coupler CP3 having four ports P1 through P4. Being used as a combiner, port P1 is used as an output port and is connected to the output port 304 of vector modulator 300, port P2 is used as a first input port and is connected to upper branch 320, port P3 is used as a second input port and is connected to lower branch 330, and port P4 is used as an isolated port and is terminated through a load resistor R2.

The modulator works by first splitting the input signal received at the input port 303 into two branch signals sent to the top and bottom branches 320 and 330, respectively. In each branch, hybrid coupler CP1 or CP2 transmits a first portion of the branch signal to the transmitted port P2 and couples a second portion of the branch signal to the coupled port P3. For a 90° hybrid coupler, the first portion and the second portion should be equal in power while having a 90° phase difference. Thus, coupler CP1 or CP2 is used to apply the branch signal in quadrature to the two diodes D1 and D2 or D3 and D4 in the top or bottom branches, respectively. Signals reflected from the diodes are combined at port P4 of coupler CP1 or CP2. Because of the symmetric arrangement in the upper branch, as shown in FIG. 3, a phase shift in the signal reflected from diode D1 should be identical to that from diode D2. Likewise, a phase shift in the signal reflected from diode D3 should be identical to that from diode D4. The magnitude and polarity of the combined signal at port P4 of coupler CP1 or CP2 is dependent on the effective RF resistance of diodes D1 and D2 or D3 and D4, respectively, and thus on voltage V1 or V2, respectively.

The signals from output ports P4 of CP1 and CP2 are combined in quadrature at the output port P1 of coupler CP3 to produce an output signal having an in-phase (I) component from the upper (or lower) branch and a quadrature (Q) component from the other branch, with a 90° phase difference between them. Thus by adjusting the voltages V1 and V2, the magnitude and polarity of the I and Q components in the output signal can be separately adjusted, allowing any phase output to be synthesized as long as the upper and lower branches are well-matched. The minimum attenuation of vector modulator 300 is limited by the cumulative component losses, while the maximum attenuation is limited by possible residual diode mismatch near the point where diode reflection coefficients are at their minimum, due to uncompensated parasitic reactance.

The exemplary implementation of vector modulator 300 shown in FIG. 3 is good for accepting large input powers with minimal distortion, and provides well-controlled and reproducible phase and amplitude adjustments. The principles employed here may also be used to design vector modulators optimized for operation at other frequencies, such as those in the 2.4 GHz frequency band.

Although PIN diodes D1 through D4 are used in the upper and lower branches 320 and 330 to allow controller 210 to adjust their effective RF resistance by varying control voltages V1 and V2, other devices having the same or similar functions can also be used. PIN diodes, however, are preferred because of their well-known property that the effective RF resistance can be precisely adjusted by manipulating the DC current there through. They also have high power handling capability and low distortion. Appropriate PIN diode that may be used as PIN diodes D1 through D4 include the SMP1302 type PIN diode manufactured by Skyworks Solutions, Inc., but many other similar products may also be employed.

Vector modulators based on FET or diode mixers may not be suitable for this application, due at least in part to their inadequate power handling capability. One possible approach to use such a vector modulator in this application is to extract a smaller proportion of the transmitted signal with coupler C2 and then to increase the nulling signal by using an amplifier after the vector modulator. Such an approach, however, leads to excessive noise at the input of the receiver, because any amplifier has at its input at least the thermal noise due to its input impedance, typically about 50 ohms. This random noise is amplified by the gain of the amplifier together with the nulling signal, and the signal-to-noise ratio is degraded because of the amplification.

Furthermore, since the wanted signal (the backscattered signal from the RFID tag) is delivered separately and is not amplified by the proposed amplifier at the vector modulator output, the addition of the amplifier will result in proportionally greater noise, degrading instead of increasing the sensitivity of the receiver. In some specialized applications it may be possible to include a modest gain amplifier after the vector modulator, but any benefit is balanced against the increased noise. Therefore, using a vector modulator with inadequate power handling capability and attempting to compensate the inadequate power handling capability by adding an amplifier at the output of the vector modulator is not recommended. In most cases, it is believed that the best course is to carefully select coupling coefficients of the couplers C1, C2, and C3, and employ robust designs for the vector modulator, such as that shown in FIG. 3.

Figure 4:
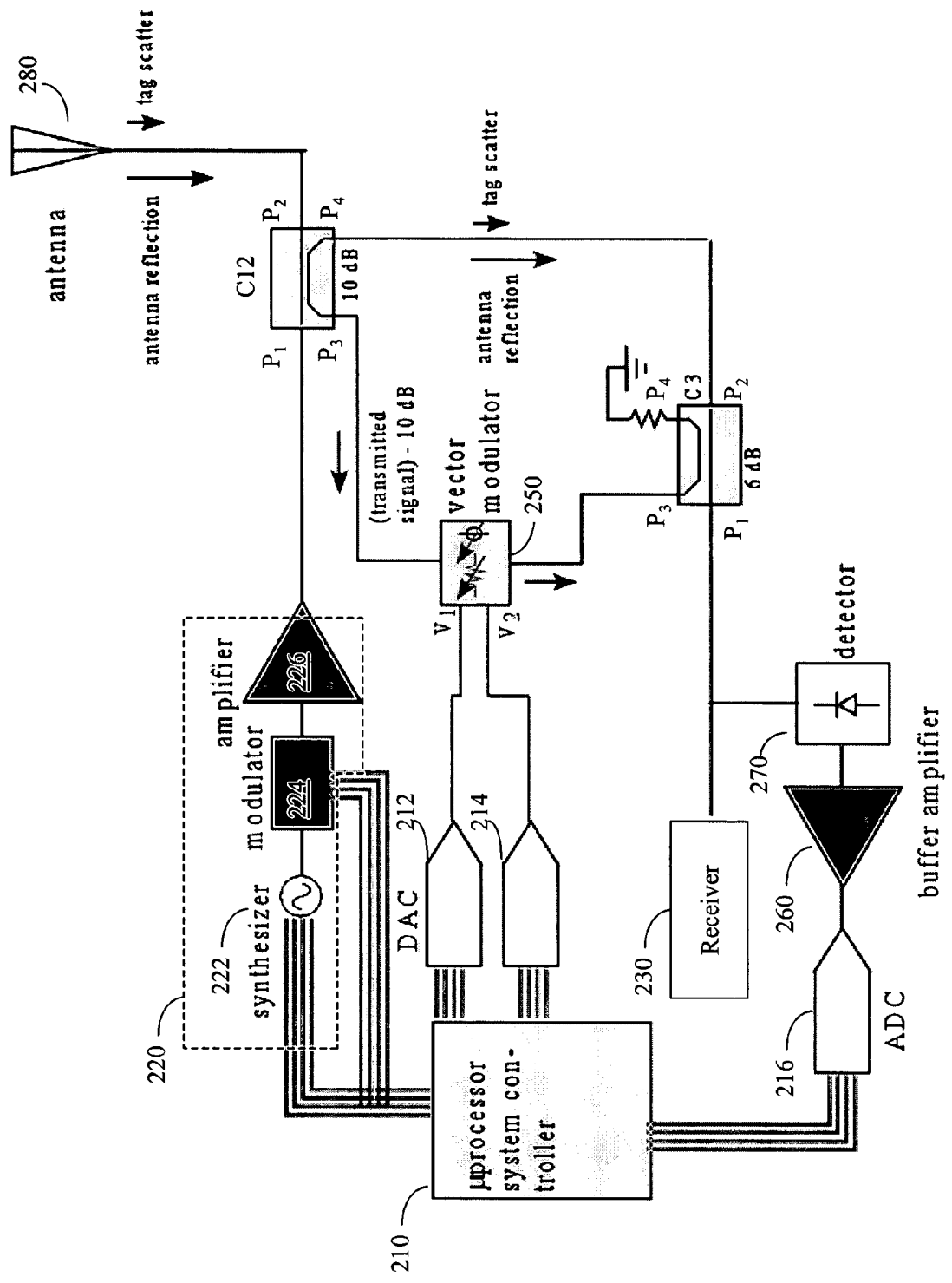
FIG. 4 is a block diagram an RFID reader employing an adaptive nulling arrangement and using a single coupler in a transmit signal path in accordance with an embodiment of the present invention.

In an alternative embodiment, couplers C1 and C2 can be combined into a single coupler C12 having four ports, two input ports P11 and P12, and two output ports P13 and P14, as shown in FIG. 4. Coupler 12 is configured to extract a portion (e.g., 10%) of a signal received at input port P11 and output the extracted portion at output P13, to extract a portion (e.g., 10%) of a signal received at input port P12 and output the extracted portion at output P14, and to allow a major portion (e.g., 90%) of a signal received at either input port P11 or input port P12 to pass to the other input port. Input port P11 is coupled to amplifier 240, input port P12 is coupled to antenna 280, output port P13 is coupled to the input of vector modulator 250, and output port P14 is coupled to port P1 of coupler C3. The embodiment shown in FIG. 4 has the advantage of reduced transmission loss because only a single coupler is traversed by the transmit signal. However, since vector modulator 250 is a load to coupler C12, vector modulator 250 should advantageously have a return loss that does not change significantly as it is adjusted, as the performance of a coupler is sensitive to variations in its load. If the vector modulator 250 employed does not provide well-controlled termination impedance, undesired interference between a state of the vector modulator and a coupling coefficient of coupler C12 for the reflected and backscattered signals may result.

Figure 5:
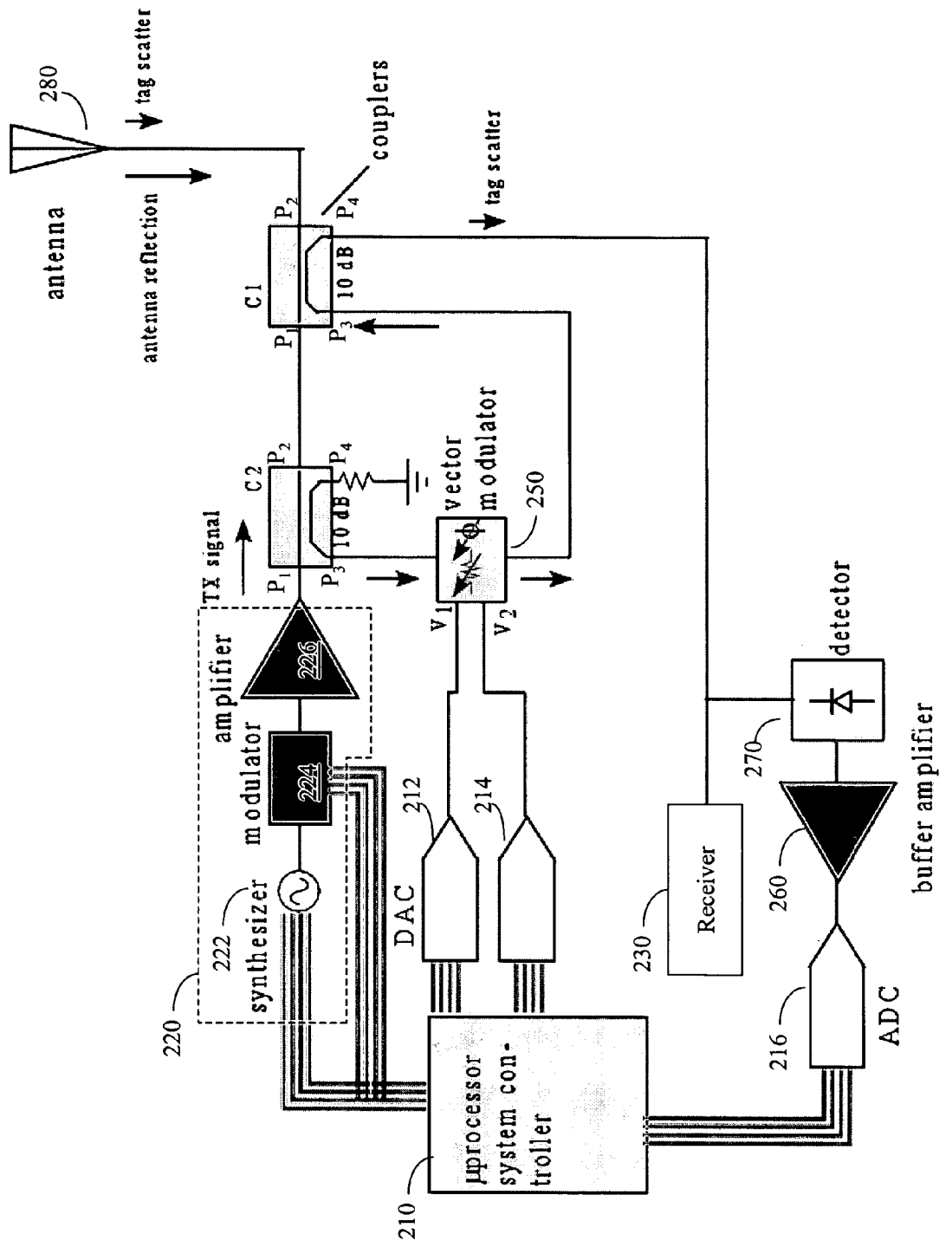
FIG. 5 is a block diagram of an RFID reader employing an adaptive nulling arrangement and using a single coupler on a receive signal path in accordance with one embodiment of the present invention.

In another alternative embodiment, as illustrated in FIG. 5, coupler C3 is not used, the isolated port P4 of coupler C1 is not terminated, and the output of the vector modulator is directed towards port P4 of coupler C1. The coupler C1 thus serves as a signal combiner that extracts portions of the reflected transmit signal from the antenna 280 and the backscatter signal from the tag, and combines the extracted portions with the nulling signal output from the vector modulator 250. Because the backscatter signal from the tag only has to go through one coupler C1, the embodiment shown in FIG. 5 is preferred when loss in the signal received from the tag must be minimized. An unintended backward-traveling image of the nulling signal, attenuated by the coupling coefficient of C1, is also launched towards C2. This unwanted signal however, should in general be harmlessly dissipated at the power amplifier output. This signal component represents minimal power loss and should have no deleterious effect on the operation of the transmitter.

Figure 6:
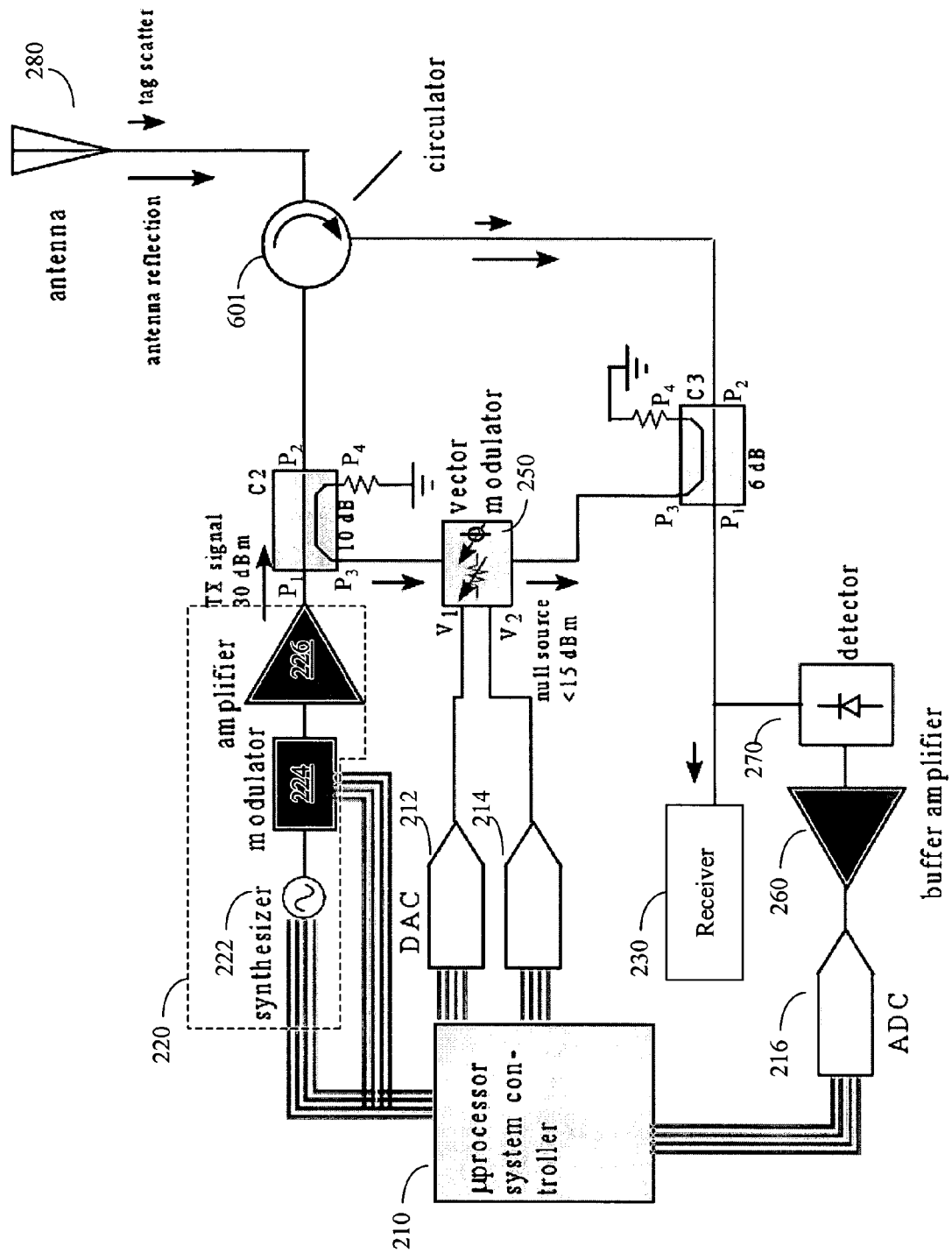
FIG. 6 is a block diagram of an RFID reader employing an adaptive nulling arrangement and a circulator in accordance with one embodiment of the present invention.

In yet another alternative embodiment, as shown in FIG. 6, a circulator 601 may be substituted for the coupler C2, as shown in FIG. 6.

The adaptive nulling of the antenna reflection, or any other unintended reflected signals, as described above, can be used to enhance the sensitivity and performance of any single-antenna interrogation architecture, including homodyne or heterodyne receivers for detecting either baseband or subcarrier-modulated backscattered signals. While the invention has been described with respect to a specific implementation at a specific frequency, it will be appreciated that the inventive principles can be applied by persons of ordinary skill to a wide variety of RF applications at various frequencies.

I claim:

1. An RFID interrogating device connected to an antenna, comprising:
   an RF transmitter configured to form a transmit signal;
   a first directional coupler configured to extract a first portion of the transmit signal;
   a vector modulator configured to adjust the first portion of the transmit signal in phase and amplitude to form a nulling signal;
   a second directional coupler configured to combine at least a portion of the nulling signal with a second portion of the transmit signal reflected from the antenna and at least a portion of a responding signal from an RFID tag received by the antenna,
   wherein the phase and amplitude of the first portion of the transmit signal is adjusted such that the nulling signal can be used to substantially cancel the second portion of the transmit signal reflected from the antenna;
   a detector configured to detect a feedback portion of a combined signal from an output of the second directional coupler; and
   a controller configured to receive an input signal formed from the feedback portion of the combined signal and to form at least one output signal based on the input signal,
   wherein the at least one output signal is used by the vector modulator to adaptively attenuate the first portion of the transmit signal and to adaptively change the phase of the first portion of the transmit signal.

2. The RFID interrogating device of claim 1, further comprising at least one digital to analog converter configured to convert the at least one output signal from the controller into a first electrical measure and a second electrical measure that are provided to the vector modulator.

3. The RFID interrogating device of claim 2, wherein the vector modulator comprises:
   a splitter configured to receive the first portion of the transmit signal from the first directional coupler and to split the first portion of the transmit signal into a first branch signal and a second branch signal;
   an upper branch coupled to the first voltage and configured to receive the first branch signal from the splitter and to form a first output signal from the first branch signal, a magnitude and polarity of the first output signal being dependent on the first voltage;
   a lower branch coupled to the second voltage and configured to receive the second branch signal from the splitter and to form a second output signal from the second branch signal, a magnitude and polarity of the second output signal being dependent on the second voltage; and a 90° hybrid coupler coupled to the upper and lower branches and configured to combine the first and second output signals in quadrature.

4. The RFID interrogating device of claim 3, wherein the upper or lower branch comprises:

a hybrid coupler having an input port, a transmitted port, a coupled port, and an output port, the input port being coupled to the splitter; and a pair of p-intrinsic-n diodes coupled to the transmitted port and the coupled port, respectively.

5. The RFID interrogating device of claim 4, wherein the hybrid coupler is a 90° hybrid coupler.

6. The RFID interrogating device of claim 4, wherein the upper or lower branch further comprises:

a pair of inductors serially coupled with each other and between the transmitted port and the coupled port of the hybrid coupler, a circuit node between the pair of inductors being coupled to the first or second voltage through a series resistor.

7. The RFID interrogating device of claim 6, wherein the upper or lower branch further comprises:

a capacitor coupled between the series resistor and ground.

8. The RFID interrogating device of claim 1, further comprising a circulator or a third directional coupler configured to couple at least a portion of the transmit signal reflected from the antenna and at least a portion of the responding signal from the RFID tag received by the antenna into an input port of the second directional coupler.

9. A method of interrogating a passive RFID tag performed by an RFID reader connected to an antenna, comprising:

forming a transmit signal;

extracting a first portion of the transmit signal;

adjusting the first portion of the transmit signal in phase and amplitude to form a nulling signal; and combining at least a portion of the nulling signal with a second portion of the transmit signal reflected from the antenna, wherein the adjusting step comprises:

splitting the first portion of the transmit signal into a first branch signal and a second branch signal;

forming a first output signal from the first branch signal, a magnitude and polarity of the first output signal being dependent on a first voltage;

forming a second output signal from the second branch signal, a magnitude and polarity of the second output signal being dependent on a second voltage; and combining the first and second output signals in quadrature.

10. The method of claim 9, wherein the first voltage and the second voltage are determined based on a feedback of a combined signal including the nulling signal and the second portion of the transmit signal.

11. The method of claim 9, wherein the adjusting step comprises adjusting the first portion of the transmit signal in phase and amplitude to form a nulling signal that substantially cancels the second portion of the transmit signal.

12. The method of claim 11, wherein the combining step comprises combining at least a portion of the nulling signal with the second portion of the transmit signal and at least a portion of a responding signal from the RFID tag received by the antenna, whereby the sensitivity of the RFID reader towards the responding signal is substantially enhanced.

* * * * *